(No Model.)
W. S. VOORHIS & G. H. HOUSER.
GRAIN CAR DOOR.
No. 275,735. Patented Apr. 10, 1883.
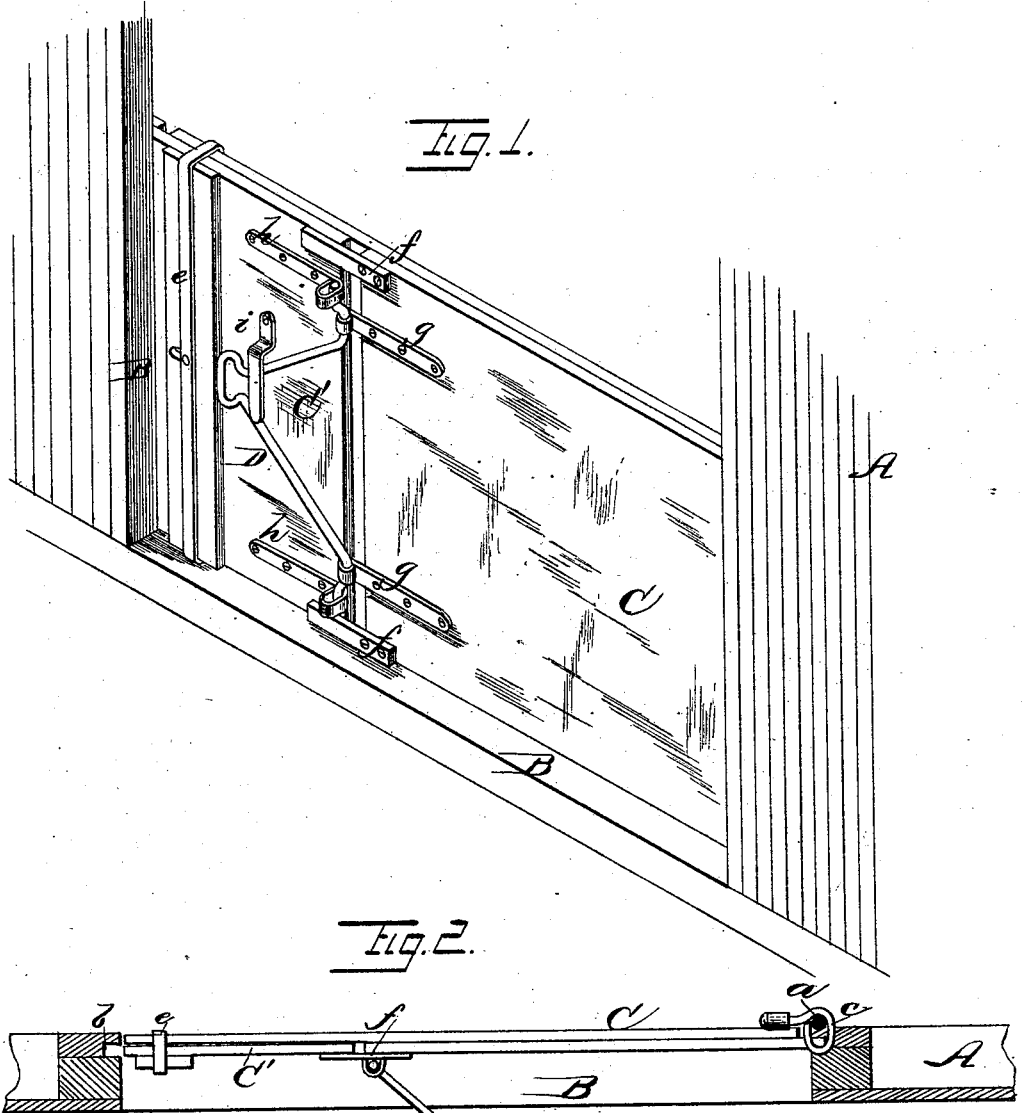
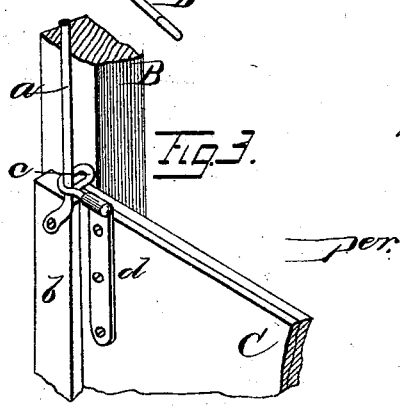

UNITED STATES PATENT OFFICE.

WINFIELD S. VOORHIS AND GEORGE H. HOUSER, OF CHICAGO, ILLINOIS.

GRAIN-CAR DOOR.

SPECIFICATION forming part of Letters Patent No. 275,735, dated April 10, 1883.

Application filed August 29, 1882. (No model.)

*To all whom it may concern:*

Be it known that we, WINFIELD S. VOORHIS and GEORGE H. HOUSER, citizens of the United States of America, residing at Chicago, in the county of Cook and State of Illinois, have invented an Improvement in Grain-Car Doors, of which the following is a specification, to wit:

This invention relates to doors for grain-cars; and it consists of a door of peculiar construction, whereby it may be easily withdrawn when the cargo is pressing against it without in any way injuring or defacing it, and swing outward or upward to any position desired, as will be hereinafter more fully described.

In order to enable others skilled in the art to avail themselves of the benefits of our invention, we will now proceed to describe its construction and operation, referring to the accompanying drawings, in which—

Figure 1 is a perspective view of our door applied to a car. Fig. 2 is a top view of the door with one side of a car in section; and Fig. 3 is a perspective view of the upper rear corner of the door, showing its swiveled and sliding fastening device.

Similar letters of reference denote similar parts throughout the several views.

A represents the side of a grain-car, and B a part of the door-frame of the same.

C is the inner half-door, which is constructed to slide vertically in grooves $b\,b$ on the uprights of the door-frame, as usual.

The rear side of the frame B is provided at its upper half with a rod, $a$, extending to the roof of the car, and to this rod the door C is secured by a swiveled eye, $c$. The shank of the eye is swiveled in the end of a metal strap, $d$, secured to the door, and its eye is elongated, and slides on the rod $a$, as shown by Figs. 2 and 3. The opposite end of the door C is provided with a sliding panel, C′, which is held in place by a metal strap, $e$, and two cleats, $f\,f$, as shown. The main portion of the door is provided with two straps, $g\,g$, having eyes in their ends, in which are journaled the ends of a hand-lever, D. The ends of this lever pass through the eyes in the straps $g\,g$, and are cranked and inserted in elongated eyes in the straps $h\,h$, secured to the sliding panel of the door C′, as seen in Fig. 1.

In the doors in ordinary use in grain or freight cars it is found that when the cargo presses against the door it is not possible to raise it in its grooves without the help of a bar to pry it up. This jams and indents the door, and soon so injures it as to render a new one necessary, besides being much trouble to remove.

It will be seen that when our door is closed in the position shown in Fig. 1 the sliding panel may be easily drawn back, no matter how great the pressure, by simply throwing back the hand-lever D. The ends of this lever, being journaled in the eye-straps $g\,g$, and having cranked end secured in the eye-straps $h\,h$, will draw the sliding panel back, as the lever is moved with ease and certainty, and when the panel is drawn back far enough to be entirely removed from its groove the door can be swung outward, the elongation of the swivel-eye $c$ allowing of this movement; or it may be slid upward on the rod $a$ and pushed inside the car on top of the cargo. The eye $c$, being swiveled in the strap $d$ on the door, gives it a universal movement, and when not in use it may be turned up against the roof, swung back against the side of the car, or twisted to any position desired. The door is not defaced by its removal, and may be used for an indefinite time, and is secured and removed much quicker and easier than those now in use. A small button, $i$, or similar device may be used to lock the lever in its closed position to prevent the jar from shaking it loose.

It is obvious that many modifications of our door may be made without altering the principle thereof, and the panel may be made to slide in different ways. The door herein described is intended especially for the inner half-door used on grain-cars behind the large outer door; but it may be used with great advantage on coal, coke, or other cars, and in some instances as an outside instead of an inside door.

Having thus fully described our invention, what we claim as new, and desire to secure by Letters Patent, is—

1. The combination, with the car A, having a rod, $a$, upon one side of its door-frame, of a door, C, provided on one of its upper corners with a single elongated and swiveled eye, $c$, adapted to slide upon the rod, whereby the door may be swung or twisted in any direction, substantially as described.

2. The combination of the door C, provided with suitable guides, with the sliding panel C′, having eye-straps $h\ h$ and cranked hand-lever D, adapted to project or retract the panel to secure or release the door, substantially as shown and described.

3. The combination, with the car-door C, having a sliding panel, C′, operated as herein described, and a swiveled and elongated eye, $c$, at its rear end, of the door-frame B, provided with a rod, $a$, and grooves $b\ b$, all constructed and arranged to operate substantially as herein described.

In testimony whereof we affix our signatures in presence of two witnesses.

WINFIELD S. VOORHIS.
GEORGE H. HOUSER.

Witnesses:
H. HARRISON,
FRANK JOHNSON.